June 1, 1954

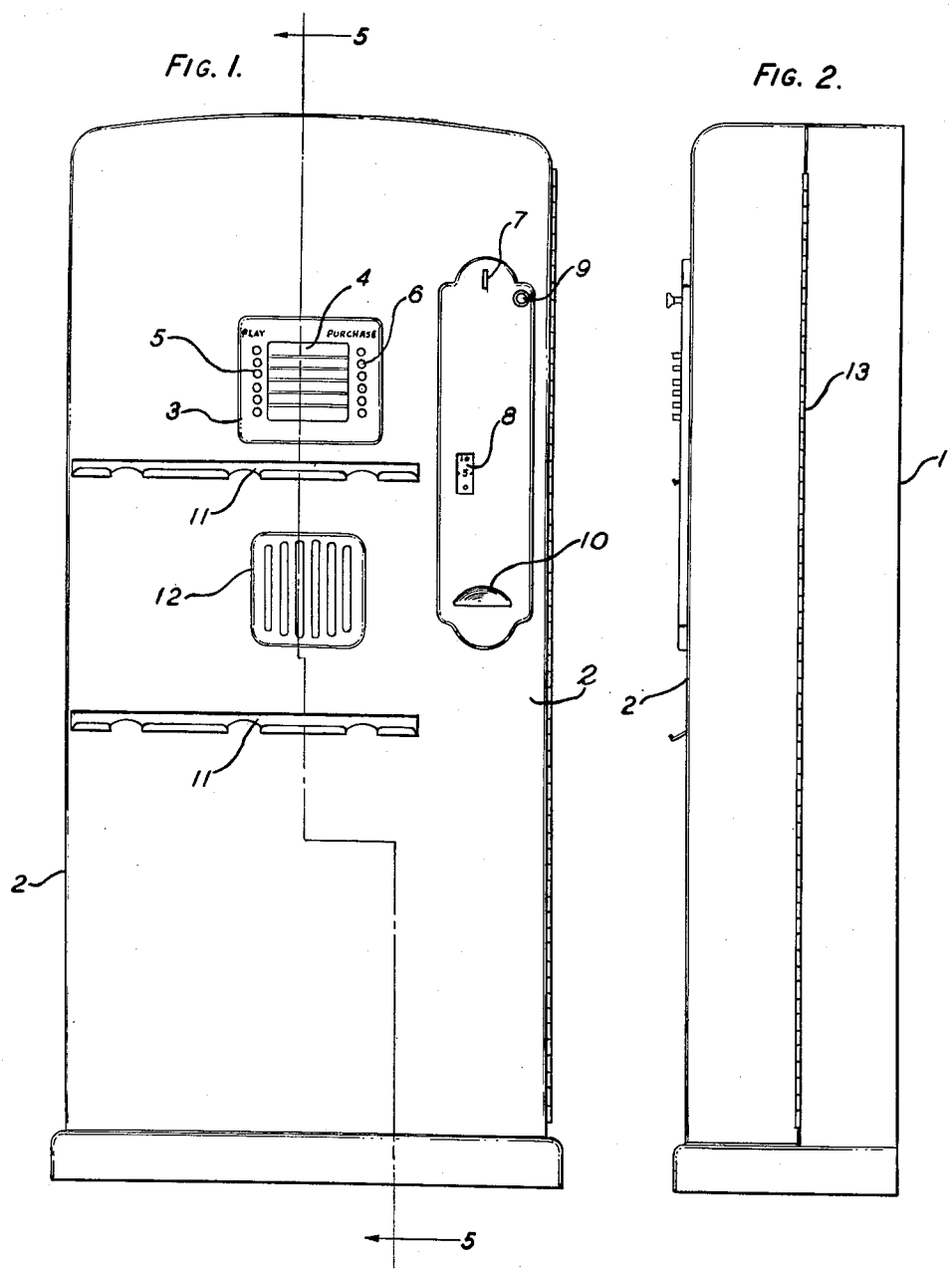

L. J. ANDRES 2,679,917

RECORD PLAYER AND VENDOR

Filed April 23, 1949

INVENTOR.
Lloyd J. Andres

June 1, 1954  L. J. ANDRES  2,679,917
RECORD PLAYER AND VENDOR
Filed April 23, 1949  5 Sheets-Sheet 3
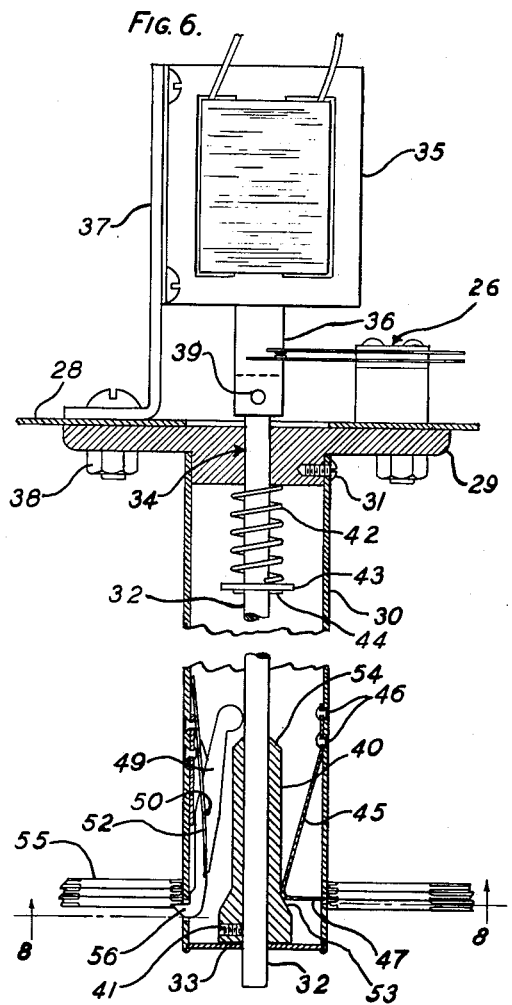
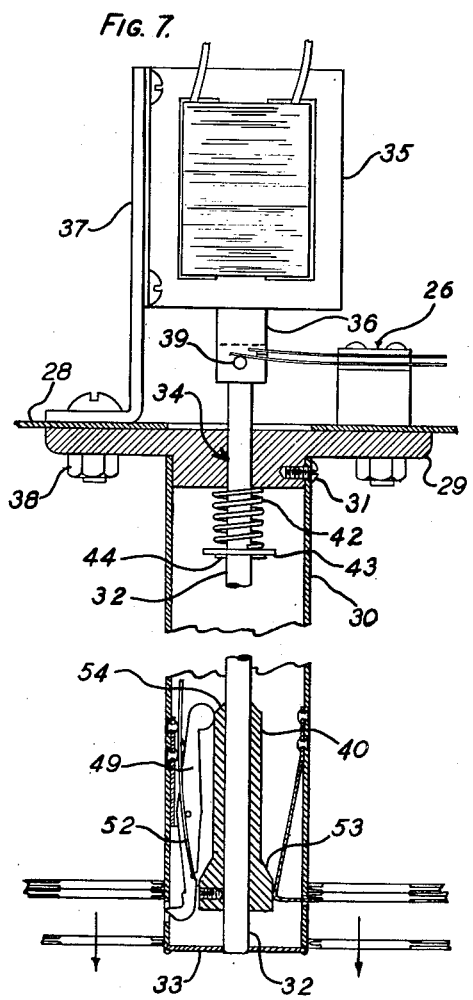
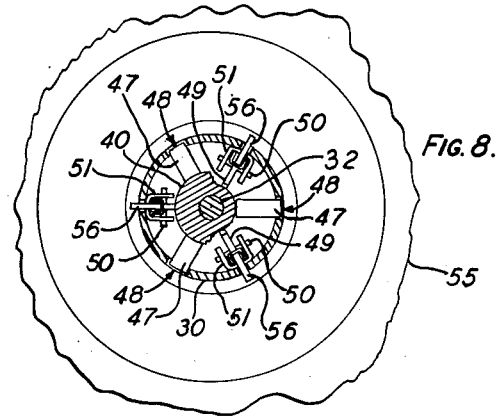
INVENTOR.
Lloyd J Andres June 1, 1954

L. J. ANDRES 2,679,917

RECORD PLAYER AND VENDOR

Filed April 23, 1949

INVENTOR.

Lloyd J. Andres

Patented June 1, 1954

2,679,917

UNITED STATES PATENT OFFICE 2,679,917

RECORD PLAYER AND VENDOR

Lloyd J. Andres, Chicago, Ill.

Application April 23, 1949, Serial No. 89,283

8 Claims. (Cl. 194—10)

This invention relates in general to vending machines and more particularly to a combination machine for playing and vending phonograph records.

The sale of phonograph records has always been handicapped in that a prospective purchaser required a demonstration playing of the record before purchase, which involved loss of time and damage to sample records and other circumstances mitigating against the seller. Heretofore phonograph record vending machines were not entirely practical due to the large size and relative fragility of the records themselves. Recently records of small diameter having a large central hole and made of plastic material have appeared on the market, which makes possible the use of a vending machine for dispensing a reasonable number of different selections of records and is capable of retaining a relatively large number of each selection in a relatively small space.

This invention also solves the problem of demonstrating the record by mechanism which upon the deposit of a predetermined minimum coin will automatically play any one of the records in the machine upon initiation and will credit this deposit toward the purchase price required for the delivery of any record selected from its repertoire. The machine also serves the purpose of a selective automatic phonograph where sound renditions only are desired.

Among the objects attained in the machine is the provision for a coin accumulating system for accumulating coins of a relatively large number of denominations and means for playing one or more sample records corresponding with the stock of records available for dispensing.

A further object of the invention is the provision of a coin operated means whereby the deposit of coins of a particular predetermined denomination for playing one or more of the records is credited to the purchase price for the automatic delivery of one or more selected records when a later deposit of sufficient coins totalling a predetermined purchase price is made.

A further object of the machine is the provision for a program showing the titles of the records contained therein with two independent switch means, one of which is manually operable for selecting a record for play and the other of which is manually operable for purchasing a selected record.

A further object of the invention is provision of circuit means partially energized upon the deposit of coins in a coin accumulator including a pair of independent selecting switches for energizing the playing of a selected record in a record player and/or energizing a selected record dispenser for dispensing a record upon the deposit of coins totalling a predetermined value in said accumulator.

Another object of the invention is the provision of a dispensing unit for retaining a plurality of coaxially stacked records including means for releasing each lowermost record successively when operated.

These and other objects in one embodiment of the invention are described and shown in the following specification and appended drawings in which:

Fig. 1 is a front elevation of the vending machine.

Fig. 2 is a side elevation of the machine shown, Fig. 1.

Fig. 6 is a cross-sectional elevation of a record dispenser unit taken generally through section line 6—6, Fig. 5.

Fig. 7 is the same as Fig. 6 in changed position.

Fig. 8 is a cross-sectional plan view taken generally through section line 8—8, Fig. 6.

Figure 4:
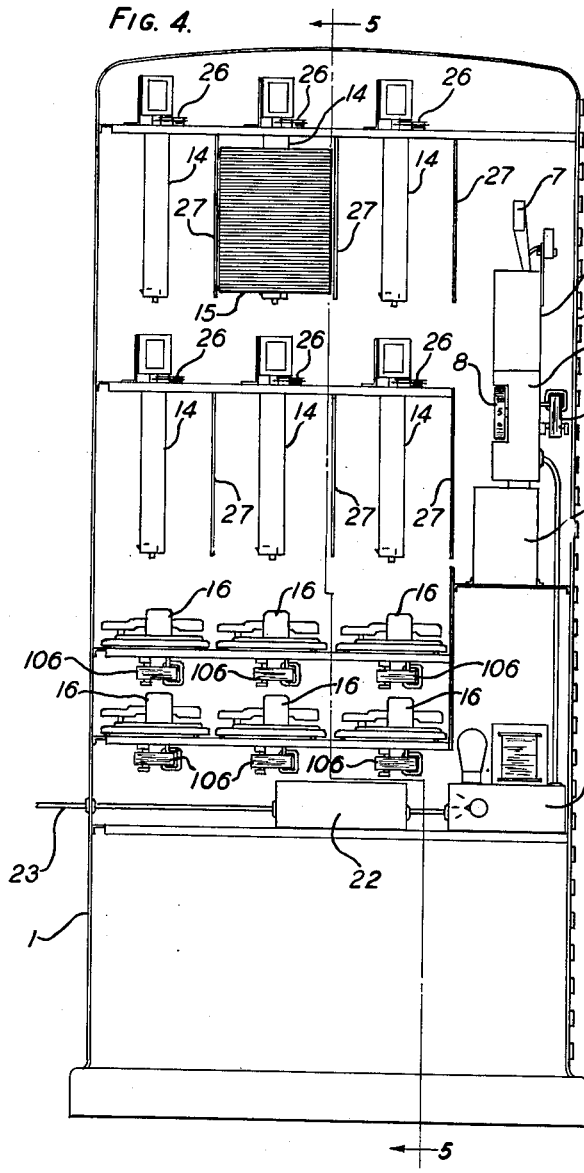
Fig. 4 is a front elevation of the machine shown, Fig. 1, with door removed.

Referring to Figs. 1 and 2 a casing which serves as a housing for the entire apparatus consists of a stationary casing 1 and a door 2. A program or title retainer 3 is positioned in the door for the convenient observation of the user. Detachable title strips 4 are intended to show the selections available. A plurality of push buttons 5, each of which is positioned adjacent to a corresponding title strip, is intended for the operation of playing a selection of one or more records. A similar plurality of buttons 6 is positioned adjacent the opposite ends of the title strips for the selective purchase of a record. A coin receiving entry 7 is intended to receive coins of various predetermined denominations and credit indicator dial 8 is intended to indicate the accumulated total credit of coins deposited. A conventional scavenger button 9 is provided to clear the coin passageway of defective coins or debris. A return cup 10 is adapted to receive excessive or defective coins deposited. The delivery trays 11 are provided to conduct dispensed records from dispensers in the machine to the purchaser. A loudspeaker grill 12 serves as a casing for a loudspeaker mounted in the door. The stationary casing and door are secured together by hinge 13 to provide convenient access to the interior parts of the machine.

Fig. 4 shows the internal arrangement of the mechanism of the machine with the door removed. Three horizontal rows of record dispensing units 14 are positioned in stationary casing 1 and are intended to support records of each selection to be vended as shown by the coaxial vertical stack 15 supported by the second unit in the upper row.

Figure 5:
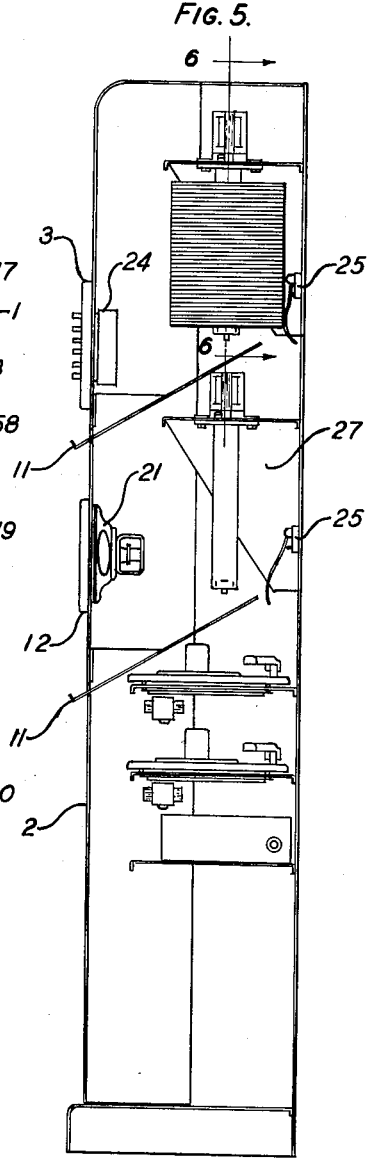
Fig. 5 is a side elevation of the machine shown Fig. 1 taken generally through section line 5—5, Figs. 1 and 4.

Referring to Fig. 5, it is apparent that when the lowermost record from each dispensing unit is released it will fall by gravity to trays 11, which are secured to the door and will be available for removal through an appropriate aperture in the door, as shown, Fig. 1.

Referring to Fig. 4, three rows of automatic record players 16 are secured to the stationary casing 1. Each player is intended to retain for repeat playing a sample of each record corresponding to the records retained on each dispenser unit. A combination coin sorter and slug rejector 17 is provided to sort and test coins deposited in entry 7. An electrically driven coin accumulator 18 is positioned beneath the rejector 17 and adapted to respond to acceptable coins passed therethrough and to accumulate the electrical equivalent of the coins deposited and indicate this accumulation on dial 8. A cash box 19 is positioned beneath the accumulator to retain accepted coins. A vacuum tube amplifier 20 is provided to amplify the output of each record player and is connected to loud-speaker 21 shown, Fig. 5, for reproducing the amplified sound. The junction box 22, shown, Fig. 4, is a housing for the play add-subtract accumulator unit and a junction for electrical connections to be hereinafter described and is fed by a conductor 23 which is connected to a source of electric energy.

Push button switch assembly 24, Fig. 5, responds to the push buttons 5 and 6, shown, Fig. 1.

Empty switches 25, Fig. 5, are positioned for operation following the dispensing of the last record and are used for illuminating corresponding signal lamps. Delivery switches 26, Fig. 4, are responsive to each delivery cycle of each dispensing unit, the detailed operation of which will be hereinafter described.

Spacers 27 are provided between the dispensing units to prevent interference between adjacent stacks of records.

A preferred embodiment of one of the dispensing units 14, shown, Fig. 4, is illustrated in Figs. 6, 7 and 8 and is secured to a shelf member 28 by a flange 29, which flange serves as a support for a tubular post 30 over which the records are retained through their central hole, which post is fastened coaxially thereto by suitable screws 31.

A shaft 32 is positioned concentric with post 30 and is guided for reciprocation by end plate 33 and a bearing 34 in flange 29.

An electro-magnet 35 having a movable core 36 is secured to a bracket 37 mounted to member 28 by bolt 38. The shaft 32 is retained to a yoke in the core 36 by pin 39.

A cylindrical cam member 40 is concentrically secured to shaft 32 by screw 41 and is in normal rest position in Fig. 6.

A spring 42 surrounding shaft 32 bears against the lower surface of flange 29 at one end and its opposite end bears against a washer 43 retained by key 44 in the shaft. Thus the shaft is urged in downward position, as shown, Fig. 6.

Three flat spring members 45 are secured inside post 30 by rivets 46 and are placed in equal relation to the axis of the shaft 32. Each of the springs has horizontal knife portions 47 positioned substantially in a plane normal to the axis of the shaft 32 and is adapted to move through apertures 48, better shown, Fig. 8. Each spring is normally urged against the outer surface of the cam member 40.

Three dogs 49 are pivotally mounted on pins 50 through brackets 51, which brackets are secured equidistant from each other to the inner periphery of the post 30. The lower end of each dog is normally urged outward by hairpin springs 52 positioned against one end of the dog 49 and the inner surface of the post 30 and behind the pins 50, as shown, Figs. 6 and 8.

The cam member 40 has lower and upper cam surfaces 53 and 54 spaced for operating springs 45 and the dogs 49 in sequence when raised.

Figure 3:
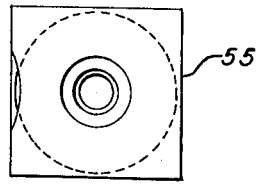
Fig. 3 is a plan view of a typical disc record in a rectangular envelope.

A plurality of records in paper envelopes 55, as shown, Fig. 3, are positioned coaxially on the post 30, as shown, Fig. 6. The lower hooked ends 56 of each dog 49 normally retain the column of records against the action of gravity in position as shown.

Each delivery switch 26 is secured to the shelf 28 in the path of movement of each pin 39.

Fig. 7 shows the relative relationship of parts in the record dispensing unit when the magnet 35 is energized. The shaft 32 in its upward movement against the action of spring 42 will first cam outward the springs 45 to move their knife portions 47 between the lowermost record and the remainder of the stack by virtue of the cam surface 53 on the cam member 40. Immediately following the knifing action the cam surface 54 of cam 40 will engage the upper end of each dog 49 and move the dog against the restraining action of hairpin spring 52 to withdraw the hooked ends from engagement with the lowermost record, which record is now permitted to fall downward by the action of gravity, as shown Fig. 7. At the upper end of the stroke of shaft 32 the delivery switch 26 will be operated by the action of pin 39, and by a circuit means to be hereinafter described, magnet 35 will be deenergized to permit the shaft to return to its downward position. Upon the downward return movement of shaft 32 the dogs will first move to project their hooked ends outward to retain the column of stacked records and upon the complete downward movement of shaft 32 the knife ends 47 of the springs 45 will be withdrawn to permit the stack to rest upon the hooked ends 56 of the dogs 49. Thus the dispensing unit is in position shown, Fig. 6, for the delivery of a subsequent record.

Referring to Fig. 4, each record player 16 is a well known mechanism for automatically playing a record when momentarily energized having its own electric motor and tone arm and including a cyclic means and a switch for stopping the mechanism at the completion of each play. For convenience and illustrative purposes a plurality of this type of player has been illustrated but it is apparent that an electrically initiated selective type record changer can be alternatively used with identical results.

Figure 9:
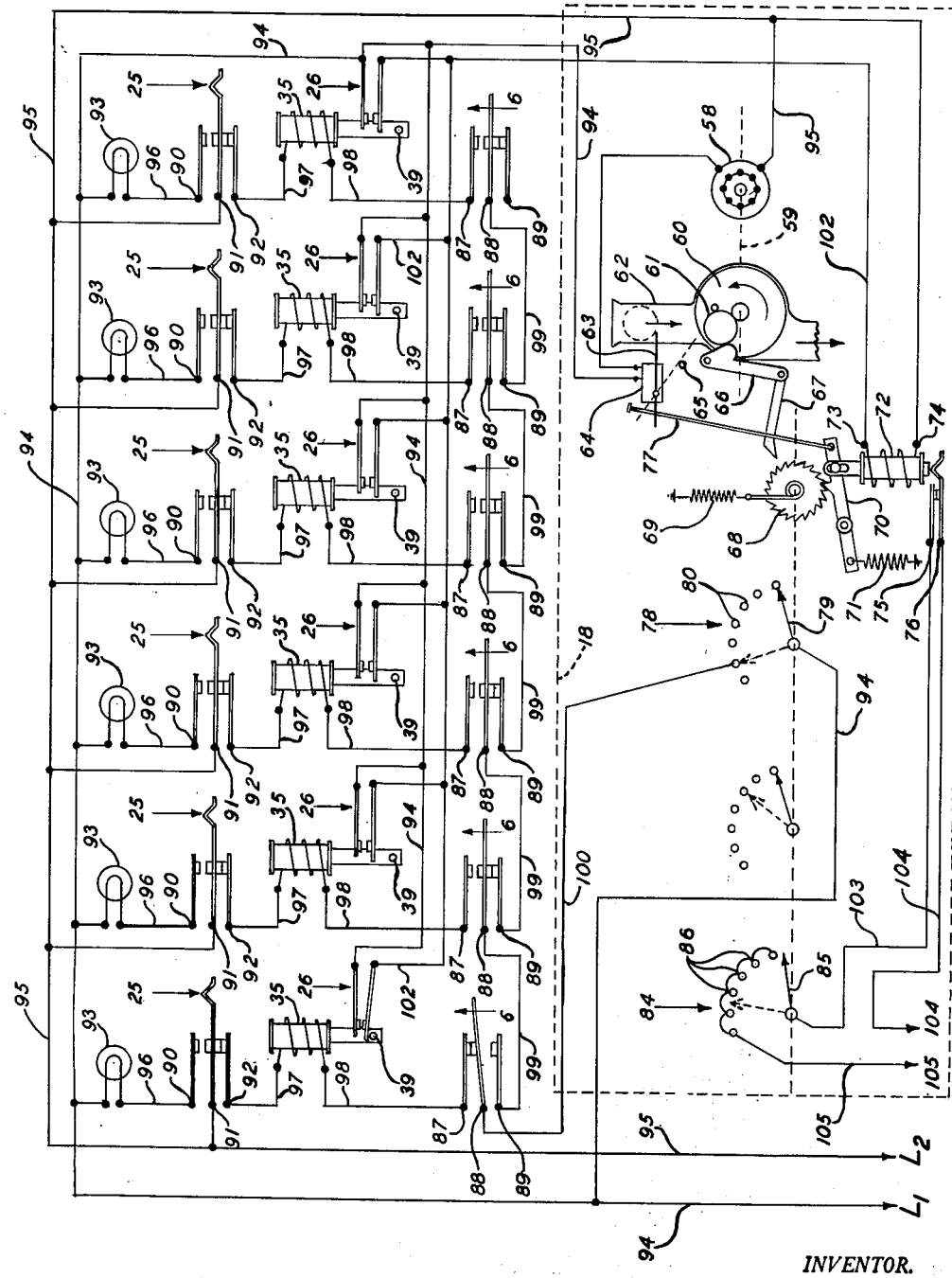
Fig. 9 is a schematic wiring diagram of the vending portion of the machine.

Although there are several types of coin accumulators applicable for use with this machine, a typical motor driven accumulator 18 is illustrated in the dotted enclosure in Fig. 9 and is driven by motor 58 and connected by shaft 59 to rotate a coin wheel for a single denomination coin, illustrated as wheel 60.

Acceptable coins 61 of single denomination descending from the rejector 17 shown, Fig. 4, descend in chute 62 and are guided into the path of rotation of wheel 60 for further movement thereof. Each coin descending in chute 62 will move arm 63 of switch 64 into temporary holding contact with permanent magnet 65, which operation will start motor 58 to rotate wheel 60. A pawl wheel 68 having teeth thereon representing unit credits (for example 5¢ each) is retained in normal inactive position by spring 69.

The one cent credit wheel is arranged to transmit one unit of credit to the five cent wheel when it has responded to five one cent credits.

A credit indicator dial 8 is intended to be driven in timed relation with wheel 60 in order to indicate to the purchaser the total credit resulting from coins deposited.

A holding pawl 70 is pivotally mounted and normally urged in position shown, by spring 71, which pawl will temporarily hold credit increments of movement of wheel 68 transmitted by movement of pawl 67.

An electro-magnet having terminals 73 and 74 has its core loosely pinned to pawl 70 for moving the pawl out of contact with the teeth of wheel 68 when energized.

A restore switch having blades 75 and 76 is positioned for operation in the path of movement of the core of magnet 72 for restoring apparatus to be hereinafter described.

A link 77 pivotally secured to pawl 70 is slidably engaged in arm 63 for restoring switch 64 against the restraining action of magnet 65 when link 77 is moved downward with pawl 70.

A purchase commutator 78 is intended to record in a step by step manner each unit value (for example 5¢) from deposited coins. A movable arm 79 will respond to movements corresponding with teeth on wheel 68 and is intended to move progressively into contact with each contact 80 when driven by wheel 68 in a step by step manner.

The purchase price of the record vended may be varied by adjusting the conductor 100 running to a predetermined contact 80.

Figure 10:
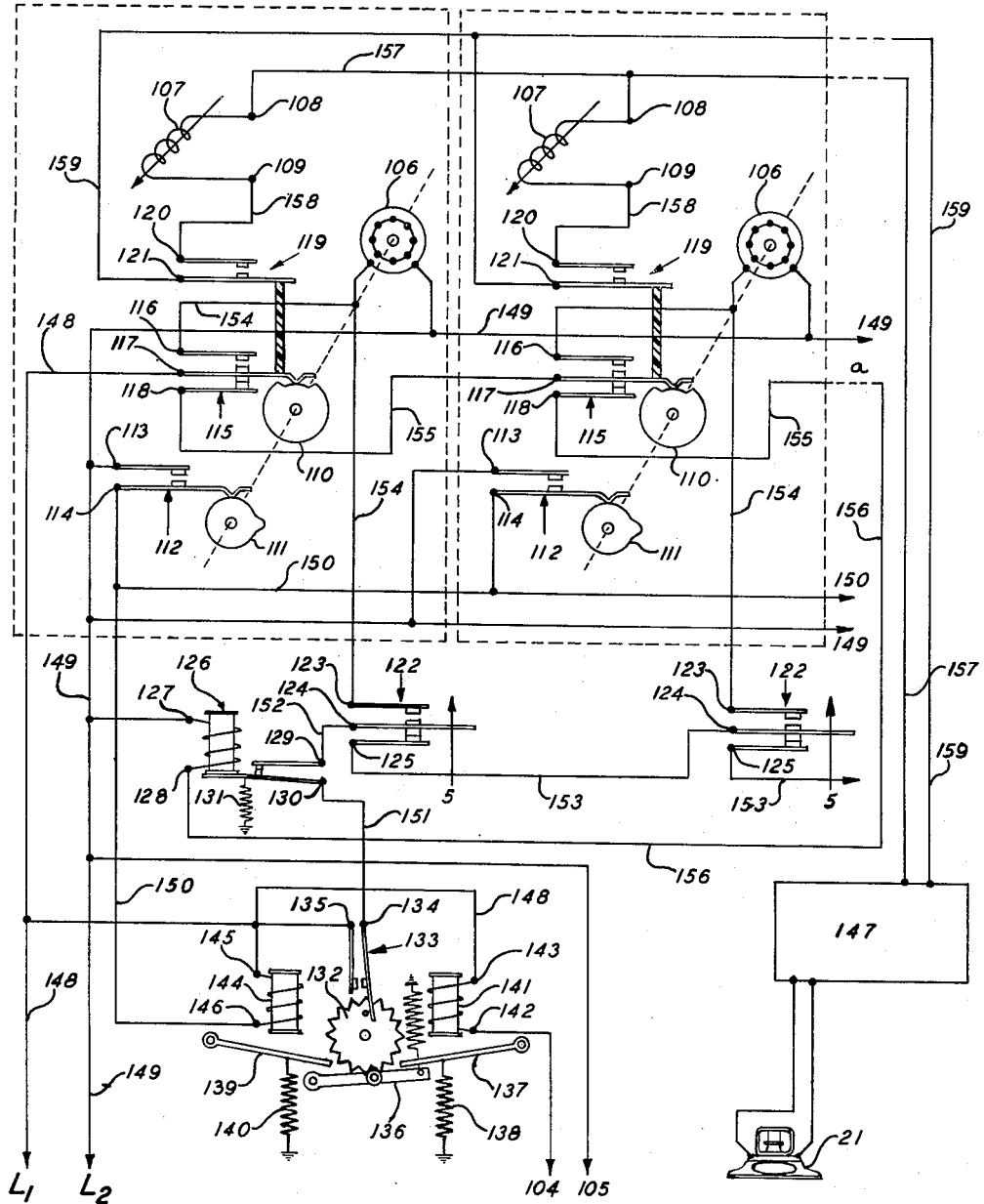
Fig. 10 is a schematic wiring diagram of the selecting and playing portion of the machine.

A pulsing commutator 84 has a contact arm 85 adapted to traverse contacts 86 directly proportional to the movement of wheel 68 for establishing credits for playing records on a separate add-subtract accumulator unit shown, Fig. 10 by momentarily completing a pulsing circuit through conductors 104 and 105.

The six electro-magnets 35 represent the electro-magnets in each dispensing unit shown, Fig. 6.

Normally open delivery switches 26 are shown in operative relation with pins 39. The purchase buttons 6, Fig. 1, are shown as arrows in operative relation with the single pole double throw purchase switches having blades 87, 88 and 89 respectively. This bank of switches is preferably of the interlock type with mechanical means provided for holding the last operated button in displaced position, such as is illustrated in the first switch, Fig. 9.

The empty switches 25 shown, Fig. 5, are also of the single pole double throw variety, having blades 90, 91 and 92 and are normally held in position shown, Fig. 9, by the presence of at least one record on each post 30.

Signal lamps 93 are intended to illuminate individual legends "Sold out" positioned behind each of the title strips 4, Fig. 1.

One side of the source of energy $L_1$ is connected by conductor 94 to movable arm 79, one terminal of each lamp 93, one of each blade of delivery switch 67 and to one terminal of coin switch 64. The remaining side of the source of electric energy $L_2$ is connected by conductor 95 to blade 91 of each empty switch 25, one terminal of motor 58 and terminals 74 of electro-magnet 72. Independent conductors 96 connect the remaining terminal of each signal lamp 93 to each blade 90 of each empty switch 25. An independent conductor 97 connects each blade 92 of empty switch 25 to one terminal of each magnet 35. An independent conductor 98 connects each remaining terminal of each magnet 35 with each blade 87 of each switch operated by push buttons 6. An independent conductor 99 connects blade 89 of each switch operated by push buttons 6 to blade 88 of each following said switch. Conductor 100 connects blade 88 of the first push button switch and a preselected contact 80 representing five units of the purchase price or 25¢. Thus the sale price is established as twenty-five cents. Conductor 102 connects the terminal blade of each delivery switch 26 to terminal 73 of magnet 72.

Arm 85 of pulsing commutator 84 is connected by conductor 103 to blade 75 of the restore switch. Each contact 86 is connected by conductor 105 and also runs to a proper conductor in Fig. 10.

Fig. 10 illustrates the selective record playing portion of the machine in which the dotted enclosures represent two of the six record players shown Fig. 4. Each record player contains a driving motor 106 which drives the mechanism for repeating the operation of the tone arm, not shown. It is understood that the mechanism in each player is adapted to include three cycles of operation following initiation: first the movement of the pickup arm from rest position to play; second, the playing of the record; third, the "cut-off" movement at the completion of play and the return of the tone arm to rest position.

Each machine contains a conventional pickup 107 having output terminals 108 and 109 respectively. Attached to each mechanism and driven during the repeating cycle thereof is a holding cam 110 and a pulsing cam 111 respectively. These cams are adapted to assume two positions during a complete cycle of the player; the first or "off" position is shown in Fig. 10. The first cycle of the record player moves the cams to operate the holding switches and momentarily operate the pulsing switches. The cam is then arrested at this point until a "cut-off" cycle of the mechanism occurs, at which time it is returned to rest position as shown. Pulsing switches 112 consist of two normally open blades 113 and 114 and are adapted to be momentarily closed during the repeating cycle of the player.

Holding switches 115 are operated by cams 110 and consist of blades 116, 117 and 118 respectively.

Pickup switches 119 are also operated by cams 110 and consist of blades 120 and 121 respectively.

Play switches 122 consisting of blades 123, 124 and 125 are intended to be independently operated by play buttons 5, shown, Fig. 1.

A "lock-out" relay consists of an electro-magnet 126 having terminals 127 and 128 and normally closed contact blades 129 and 130, which blades are opened by spring 131 when magnet 126 is de-energized.

A conventional add-subtract accumulator unit for receiving play credits is provided with a rotatable toothed wheel 132 and is adapted to open normally closed switch 133 which consists of blades 134 and 135 when in zero credit position.

A spring retained detent arm 136 temporarily retains wheel 132 following each movement thereof.

A pivotally mounted magnetic pawl 137 is positioned to advance wheel 132 in step by step manner and is normally retained in inactive position by spring 138.

A magnetic pawl 139 is pivoted opposite pawl 137 and adapted to move the wheel 132 in opposite direction in step by step manner against the restraining action of spring 140 when operated.

An electro-magnet 141 having terminals 142 and 143 is positioned to attract pawl 137 for adding credits when energized.

An electro-magnet 144 having terminals 145 and 146 is positioned to attract pawl 139 and subtract credits when energized.

A vacuum tube amplifier 147, shown as part 20 in Fig. 4, is used to amplify the output of each pickup 107 when connected.

A loudspeaker 21, shown, Fig. 5, is provided to reproduce the output of amplifier 147.

One side of a source of energy $L_1$ is connected by conductor 148 to terminals 143 and 145 of magnets 141 and 144 respectively, to blade 135 of switch 133 and to blade 117 of the first holding switch 115.

The remaining source of energy $L_2$ is connected by conductor 149 to terminal 127 of magnet 126 to blades 113 of switches 112 and to one terminal of each motor 106.

Terminal 146 of magnet 144 is connected by conductor 150 to each blade 114 of each switch 112.

Conductor 152 connects the contact blade 129 of the relay to blade 124 of the first play switch 122.

An independent conductor 153 connects each blade 125 of the switches 122 to blade 124 of each successive switch 122.

An independent conductor 154 connects each blade 123 of each switch 122 to each remaining terminal of motors 106 and each switch blade 116 of each switch 115 respectively.

Independent conductors 155 connect each blade 118 of each switch 115 to blade 117 of each successive switch 115.

The blade 118 of the last switch 115 in the series is connected by conductor 156 to conductor 155 at (a) and to terminal 128 of relay magnet 126.

The dotted junction of conductors 155 and 156 represents the point of insertion of the four remaining record changers and the arrows 149, 150 and 153 also represent connections to the remaining four record players.

Arrows 104 and 105 indicate connections to conductors 104 and 105 in Fig. 9.

Conductor 157 connects terminals 108 of pickups 107 to one input terminal of amplifier 147.

An independent conductor 158 connects each terminal 109 of each pickup 107 to each blade 120 of each corresponding switch 119.

Conductor 159 connects each blade 121 of each switch 119 to the remaining input terminal of the amplifier 147.

Under the assumption that the user presses push button 5 corresponding to the first play switch 122 then a momentary starting circuit will be completed through conductor 154 to the corresponding record changer motor 106 which circuit returns through conductor 149 to line $L_2$.

The starting of this motor 106 will begin the movement of the tone arm into playing position with the record on the record player and simultaneously operate switches 115 and 119. The movement of switch 115 will complete a holding circuit to motor 106 by virtue of blades 116 and 117 of the switch and conductor 154. It is to be noted that the blades 117 and 118 are now open, which prevents any of the other record players from being energized through the series conductor 155.

This open circuit through conductor 155 by virtue of a series connection through all the switches 115 now de-energizes the normally closed circuit through conductor 156 and permits the magnet 126 of the "lock-out" relay to be de-energized, thus opening its contacts 129 and 130 and preventing any of the switches 122 being energized until the completion of the play of the first selected record player.

As soon as the cam 110 has moved sufficiently far to operate switch 115 it will come to rest by means of mechanism not shown and remain so during the play of the record on the player. The switch 119 having been closed by the first movement of the cam 110 will complete a circuit from the pickup 107 through conductors 157, 158 and 159 to the amplifier 147 which will operate loudspeaker 21 to reproduce the selection being played.

Upon completion of play of the selected record the tone arm is returned to its initial position by means of mechanism not shown and again rotates cams 110 and 111. This movement of cam 111 will momentarily close pulsing switch 112 to complete a momentary circuit through subtract-magnet 144 which will return wheel 132 to its initial position and simultaneously open the blades of switch 133.

When the pickup is returned to its normal rest position the cam 110 will have returned switches 119 and 115 to their normal inoperative positions as shown.

It is apparent from the above that the deposit of additional coins will advance wheel 132 to provide additional credits for play purposes which will permit the operation of additional selected switches 122 and their corresponding record players corresponding to the value of coins deposited. Improper manipulation or operations in excess of those corresponding to coins deposited are prevented by virtue of the independent series connections between switches 115 and switches 122 in conjunction with the operation of the "lockout" relay.

It is also to be noted that the play of the records corresponding to the deposit of coins does not cancel the credit for the purchase of records held by wheel 68, Fig. 9, which credit will be shown on dial 8. Should the user desire to purchase a selected record he first will choose the desired record by selecting and pressing a button 6, Fig. 9, corresponding thereto and continue the deposit of coins in the accumulator until wheel 68 has advanced commutator arms 79 to its sale price position which occurs when the arm 79 has reached a contact 80 to which the conductor 100 is terminated. This movement will complete a circuit from the line L₁ through conductor 94 through commutators 78 and 81 through the now closed blades 88 and 87 corresponding to the depressed button 6 through conductor 98 to energize magnet 35 of a corresponding record dispenser unit, which circuit is returned through conductor 97 the closed blades 91 and 92 of empty switch 25 to conductor 95 to line L₂.

The energizing of magnet 35 will operate the dispensing unit shown, Fig. 6, to release a lowermost record therefrom to the delivery tray 11.

At the extreme upward return motion of the core of the magnet 35 pin 39 will momentarily close delivery switch 26 which will energize restore magnet 72 through conductors 102 and 95. When the restore magnet 72 is energized pawl 79 and link 77 will be simultaneously retracted to permit wheel 68 and commutators 78, 81 and 84 to return to their normal positions.

Link 77 will release arm 63 of switch 64 from the magnet 65 whereby it will return to its normal position by spring means within the switch and de-energize motor 58.

Concurrently with the operation of magnet 72 the blades 75 and 76 of the safety switch will be opened to prevent the commutator 84 from energizing a circuit through conductors 104 and 105 to the add-magnet shown in the diagram, Fig. 10.

It is apparent from the above that whenever sufficient coins are deposited in the accumulator to establish a circuit through commutator 78 and any one of the depressed buttons 6 will result in releasing a record from a corresponding dispensing unit.

The reason for preferring the use of an interlock mechanism for the switches controlled by button 6 is to insure that a record will always be dispensed when sufficient coins are deposited.

The release of records in addition to those corresponding to the proper deposit of coins is prevented by the independent series conductor 99 between the selecting switches together with the restoring action of the automatic accumulator responsive to each delivery switch 26.

In the event that any one record dispenser becomes empty its corresponding switch 25 will operate to illuminate a corresponding lamp 93 which will indicate to the purchaser that the particular selection is sold out. Having described my invention I claim:

1. A selecting system for a combination coin operated record playing and dispensing machine comprising an electric coin accumulator means responsive in proportional movement to a predetermined value of coins deposited therein, an electric circuit closing means driven by said coin accumulator means adapted to operate when a predetermined total value of coins is deposited, an electric commutator driven by said coin accumulator means, a selective record dispenser including an electric release means adapted to dispense a selected record when energized, electric purchase switch means adapted to selectively energize said release means, electric cancel means responsive to movement of said dispenser means for restoring said coin accumulator when operated, an electric selective record player adapted to play a selected record when energized, an electric play accumulator having an add-magnet adapted to add credits when momentarily energized by said commutator corresponding to predetermined coins deposited in said coin accumulator, said play accumulator having a subtract-magnet responsive to each operation of said record player to subtract therefrom one credit for each operation of said player, electric pulsing switch means in and responsive to said player for momentarily energizing said subtract-magnet for each play of said player, electric play switch means for selectively energizing said record player, an electric circuit means connecting all the above said electric elements whereby the deposit of a predetermined minimum value in coins in said coin accumulator means will energize and operate said coin accumulator means and simultaneously energize and operate said commutator to energize said add-magnet in said play accumulator for one play and whereby the selective operation of said play switch means will energize said record player to play a corresponding record and said player to operate said electric pulsing switch means to momentarily energize said subtract-magnet to cancel said credit in the said play accumulator and upon the deposit of a predetermined value in additional coins the selective manual operation of said purchase switch means will energize said record dispensing means to release a selected record and simultaneously operate said cancel means to restore said coin accumulating means to normal position.

2. In a coin operated machine for selectively playing and vending disc phonograph records, a record dispensing unit adapted to retain a stacked column of records having similar recordings, a first accumulator for receiving coins and having means for crediting the amount deposited, release means for releasing the lowermost record of said stacked column when the predetermined amount for purchasing a record has been deposited in said accumulator, an electric purchase switch for said release means, an electric record player for playing a record similar to the record of said column, electric play switch means for said record player, a movable member driven by said first accumulator, an add-subtract accumulator adapted for energization in response to movement of said member for establishing credits for playing records, means, upon depositing in said first accumulator a predetermined amount to play a record, for adding credit in said add-subtract accumulator and completing a circuit to said play switch means, means upon actuation of said play switch means and play of said record for subtracting credit for playing records from said add-subtract accumulator, and means upon actuation of said purchase switch for completing a circuit from said first accumulator to said release means to energize the latter when the total amount deposited in said first accumulator equals the predetermined amount for purchasing a record.

3. In a coin operated machine for selectively playing and vending disc phonograph records, a record dispensing unit adapted to retain a stacked column of records having similar recordings, a first accumulator for receiving coins and having switch means for crediting the amount deposited, release means for releasing the lowermost record of said stacked column when the predetermined amount for purchasing a record has been deposited in said accumulator, an electric purchase switch for said release means, an electric record player for playing a record similar to the record of said column, electric play switch means for said record player, an electric pulsing means driven by said first accumulator, an add-subtract accumulator adapted for energization in response to movement of said pulsing means for establishing credits for playing records, means upon depositing a predetermined amount for playing a record in said first accumulator for adding credit in said add-subtract accumulator and completing a circuit to said play switch means, means upon actuation of said play switch means and play of said record for subtracting credit for playing records from said add-subtract accumulator and means upon actuation of said purchase switch for completing a circuit from said first accumulator switch means to said release means to energize the latter when the total amount deposited in said first accumulator equals the predetermined amount for purchasing a record.

4. In a coin operated machine for selectively playing and vending disc phonograph records, a record dispensing unit adapted to retain a stacked column of records having similar recordings, a first accumulator for receiving coins and having switch means for crediting the amount deposited, release means including a magnet for releasing the lowermost record of said stacked column when the predetermined amount for purchasing a record has been deposited in said acmumulator, an electric purchase switch for said release means, an electric record player for playing a record similar to the record of said column, electric play switch means for said record player, an electric pulsing means driven by said first accumulator, an add-subtract accumulator having an add magnet and a subtract magnet adapted for energization in response to movement of said pulsing means for establishing credits for playing records, means upon depositing a predetermined amount for playing a record in said first accumulator for adding credit in said add-subtract accumulator and completing a circuit to said play switch means, means upon actuation of said play switch means and play of said record for subtracting credit for playing records from said add-subtract accumulator and means upon actuation of said purchase switch for completing a circuit from said first accumulator switch means to said release means magnet to energize the latter when the total amount deposited in said first accumulator equals the predetermined amount for purchasing a record and means following energization of said release means for cancelling credit in said first accumulator.

5. In a coin operated machine for selectively playing and vending disc phonograph records, a record dispensing unit adapted to retain a stacked column of records having similar recordings, a first accumulator for receiving coins and having switch means for crediting the amount deposited, release means for releasing the lowermost record of said stacked column when the predetermined amount for purchasing a record has been deposited in said accumulator, an electric purchase switch for said release means, an electric record player for playing a record similar to the record of said column, electric play switch means for said record player, an electric pulsing means driven by said first accumulator, an add-subtract accumulator adapted for energization in response to movement of said pulsing means for establishing credits for playing records, circuit means for connecting said release means, purchase switch, record player, play switch and said accumulators, means upon depositing a predetermined amount for playing a record in said first accumulator for adding credit in said add-subtract accumulator and completing a circuit to said play switch means, means upon actuation of said play switch means and play of said record for subtracting credit for playing records from said add-subtract accumulator and means upon actuation of said purchase switch for completing a circuit from said first accumulator switch means to said release means to energize the latter when the total amount deposited in said first accumulator equals the predetermined amount for purchasing a record and means following energization of said release means for cancelling credit in said first accumulator, and an indicator dial driven by said first accumulator adapted to indicate the increment of credit of said accumulator switch means.

6. In a coin operated machine for selectively playing and vending disc phonograph records, a plurality of record dispensing units each adapted to retain a stacked column of records having similar recordings, a first accumulator for receiving coins and having switch means for crediting the amount deposited, release means for each unit for releasing the lowermost record of said stacked column when the predetermined amount for purchasing a record has been deposited in said accumulator, an electric purchase switch for each release means, an electric record player associated with each unit for playing a record similar to the record of the stacked column with which it is associated, electric play switch means for each record player, an electric pulsing means driven by said first accumulator, an add-subtract accumulator adapted for energization in response to movement of said pulsing means for establishing credits for playing records, means upon depositing a predetermined amount for playing a record in said first accumulator for adding credit in said add-subtract accumulator and completing a circuit to said play switches, means upon actuation of a selected play switch means and play of the record selected for subtracting credit for playing records from said add-subtract accumulator, and means upon actuation of a selected purchase switch for completing a circuit from said first accumulator switch means to the release means corresponding with the selected purchase switch to energize the release means when the total amount deposited in said first accumulator equals the predetermined amount for purchasing a record.

7. In a coin operated machine for selectively playing and vending disc phonograph records, a plurality of record dispensing units each adapted to retain a stacked column of records having similar recordings, a first accumulator for receiving coins and having switch means for crediting the amount deposited, release means for each unit for releasing the lowermost record of said stacked column when the predetermined amount for purchasing a record has been deposited in said accumulator, an electric purchase switch for each release means, an electric record player associated with each unit for playing a record similar to the record of the stacked column with which it is associated, electric play switch means for each record player, an electric pulsing means driven by said first accumulator, an add-subtract accumulator adapted for energization in response to movement of said pulsing means for establishing credits for playing records, circuit means for connecting said release means, said purchase switches, said record players, said play switches and said accumulators means upon depositing a predetermined amount for playing a record in said first accumulator for adding credit in said add-subtract accumulator and completing a circuit to said play switches, means upon actuation of a selected play switch means and play of the record selected for subtracting credit for playing records from said add-subtract accumulator, means preventing energization of additional record player until completion of play of the selected record, and means upon actuation of a selected purchase switch for completing a circuit from said first accumulator switch means to the release means corresponding with the selected purchase switch to energize the release means when the total amount deposited in said first accumulator equals the predetermined amount for purchasing a record.

8. In a coin operated machine for selectively playing and vending disc phonograph records, a plurality of record dispensing units each adapted to retain a stacked column of records having similar recordings, a first accumulator for receiving coins and having switch means for crediting the amount deposited, release means for each unit for releasing the lowermost record of said stacked column when the predetermined amount for purchasing a record has been deposited in said accumulator, an electric purchase switch for each release means, an electric record player associated with each unit for playing a record similar to the record of the stacked column with which it is associated, electric play switch means for each record player, an electric pulsing means driven by said first accumulator, an add-subtracted accumulator having an add-magnet and a subtract-magnet adapted for energization in response to movement of said pulsing means for establishing credits for playing records, circuit means for connecting said release means, said purchase switches, said record players, said play switches and said accumulators means upon depositing a predetermined amount for playing a record in said first accumulator for adding credit in said add-subtract accumulator and completing a circuit to said play switches, means upon actuation of a selected play switch means and play of the record selected for subtracting credit for playing records from said add-subtract accumulator, means preventing energization of additional record player until completion of play of the selected record and means upon actuation of a selected purchase switch for completing a circuit from said first accumulator switch means to the release means corresponding with the selected purchase switch to energize the release means when the total amount deposited in said first accumulator equals the predetermined amount for purchasing a record, and means following energization of the selected release means for cancelling credit in said first accumulator.

References Cited in the file of this patent

UNITED STATES PATENTS

| Number | Name | Date |
|---|---|---|
| 1,058,144 | Blank | Apr. 8, 1913 |
| 1,649,365 | Poling | Nov. 15, 1927 |
| 2,271,397 | McDermott | Jan. 27, 1942 |
| 2,330,186 | Jetseck | Sept. 21, 1943 |
| 2,333,176 | Hoban | Nov. 2, 1943 |
| 2,321,402 | Margulis | June 8, 1943 |
| 2,398,543 | Lo Cascio et al | Apr. 16, 1946 |
| 2,417,537 | Wyckuff | Mar. 18, 1947 |
| 2,435,933 | Toolan | Feb. 10, 1948 |